US012283229B2

(12) United States Patent
Zhang

(10) Patent No.: US 12,283,229 B2
(45) Date of Patent: Apr. 22, 2025

(54) PIXEL CIRCUIT, DRIVING METHOD THEREOF, DISPLAY PANEL, AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/369,915

(22) Filed: Sep. 19, 2023

(65) Prior Publication Data

US 2024/0005852 A1 Jan. 4, 2024

(30) Foreign Application Priority Data

Feb. 23, 2023 (CN) ......................... 202310161668.3

(51) Int. Cl.
*G09G 3/32* (2016.01)

(52) U.S. Cl.
CPC ....... *G09G 3/32* (2013.01); *G09G 2310/0245* (2013.01); *G09G 2310/0267* (2013.01); *G09G 2320/0233* (2013.01); *G09G 2320/0247* (2013.01)

(58) Field of Classification Search
CPC ............. G09G 3/32; G09G 2320/0233; G09G 2310/0245; G09G 2310/0267; G09G 2320/0247; G09G 2300/0819; G09G 2300/0842; G09G 2300/0861; G09G 2310/0251; G09G 2310/08; G09G 2310/061; G09G 3/3233; G09G 3/3225; G09G 3/3258; G09G 2320/02
See application file for complete search history.

(56) References Cited

U.S. PATENT DOCUMENTS

2020/0135104 A1* 4/2020 Hou ..................... G09G 3/3266
2021/0383752 A1* 12/2021 Yang .................... G09G 3/3233
2022/0335872 A1* 10/2022 Zhang ...................... G09G 3/20

* cited by examiner

*Primary Examiner* — Muhammad N Edun
(74) *Attorney, Agent, or Firm* — KDW Firm PLLC

(57) ABSTRACT

A driving method of a pixel circuit includes controlling a voltage write module to transmit a reset voltage to a first terminal or a control terminal of the drive module in a first stage; and controlling a voltage write module to transmit the reset voltage to the first terminal of the drive module in a second stage. An interval duration between at least one second stage and an adjacent first stage or an adjacent second stage is a first duration, and an interval duration between any second stage and an adjacent first stage or an adjacent second stage is a second duration. In at least part of display cycles, the first duration is different from a total duration of a write frame, and an absolute value of a difference between the second duration and the total duration of the write frame is less than or equal to a preset duration.

19 Claims, 10 Drawing Sheets

PIXEL CIRCUIT, DRIVING METHOD THEREOF, DISPLAY PANEL, AND DISPLAY DEVICE

CROSS-REFERENCE TO RELATED APPLICATION(S)

This application claims priority to a Chinese Patent Application No. 202310161668.3 filed on Feb. 23, 2023, the disclosure of which is incorporated herein by reference in its entirety.

TECHNICAL FIELD

Embodiments of the present disclosure relate to the field of display technologies and, in particular, to a pixel circuit, a driving method thereof, a display panel, and a display device.

BACKGROUND

With the constant development of display technologies, people have increasingly higher requirements for the performance of a display panel. The existing display panel may perform displaying at different refresh rates in different display modes. Currently, when the display panel performs displaying at a relatively low refresh rate, a display screen is prone to the flickering problem.

SUMMARY

Embodiments of the present disclosure provide a pixel circuit, a driving method thereof, a display panel, and a display device.

In the first aspect, an embodiment of the present disclosure provides a driving method of a pixel circuit. The pixel circuit includes a drive module and a voltage write module, where the drive module is configured to drive a light-emitting element in a display cycle, the display cycle includes a write frame and a retention frame, the voltage write module is connected to a first terminal of the drive module, a working stage of the voltage write module includes at least one first stage and at least one second stage, the first stage is located in the write frame, and the second stage is located in the retention frame.

The driving method of the pixel circuit includes the steps described below.

In the first stage, the voltage write module is controlled to be turned on so that the voltage write module transmits a reset voltage to the first terminal or a control terminal of the drive module.

In the second stage, the voltage write module is controlled to be turned on so that the voltage write module transmits the reset voltage to the first terminal of the drive module.

An interval duration between the at least one second stage and an adjacent first stage or between the at least one second stage and an adjacent second stage is a first duration, and an interval duration between any second stage and an adjacent first stage or between any second stage and an adjacent second stage is a second duration, where in at least part of display cycles, the first duration is different from a total duration of the write frame, and an absolute value of a difference between the second duration and the total duration of the write frame is less than or equal to a preset duration.

In the second aspect, an embodiment of the present disclosure provides a pixel circuit. The pixel circuit includes a drive module and a voltage write module.

The drive module is configured to drive a light-emitting element in a display cycle, where the display cycle includes a write frame and a retention frame.

The voltage write module is connected to a first terminal of the drive module, where a working stage of the voltage write module includes at least one first stage and at least one second stage, the first stage is located in the write frame, the second stage is located in the retention frame, and the voltage write module is configured to transmit a reset voltage to the first terminal or a control terminal of the drive module in the first stage and transmit the reset voltage to the first terminal of the drive module in the second stage.

An interval duration between the at least one second stage and an adjacent first stage or between the at least one second stage and an adjacent second stage is a first duration, and an interval duration between any second stage and an adjacent first stage or between any second stage and an adjacent second stage is a second duration, where in at least part of display cycles, the first duration is different from a total duration of the write frame, and an absolute value of a difference between the second duration and the total duration of the write frame is less than or equal to a preset duration.

In the third aspect, an embodiment of the present disclosure provides a display panel. The display panel includes a pixel circuit, and the pixel circuit includes a drive module and a voltage write module.

The drive module is configured to drive a light-emitting element in a display cycle, where the display cycle includes a write frame and a retention frame.

The voltage write module is connected to a first terminal of the drive module, where a working stage of the voltage write module includes at least one first stage and at least one second stage, the first stage is located in the write frame, the second stage is located in the retention frame, and the voltage write module is configured to transmit a reset voltage to the first terminal or a control terminal of the drive module in the first stage and transmit the reset voltage to the first terminal of the drive module in the second stage.

An interval duration between the at least one second stage and an adjacent first stage or between the at least one second stage and an adjacent second stage is a first duration, and an interval duration between any second stage and an adjacent first stage or between any second stage and an adjacent second stage is a second duration, where in at least part of display cycles, the first duration is different from a total duration of the write frame, and an absolute value of a difference between the second duration and the total duration of the write frame is less than or equal to a preset duration.

In the fourth aspect, an embodiment of the present disclosure provides a display device. The display device includes the display panel described in the third aspect.

BRIEF DESCRIPTION OF DRAWINGS

To illustrate technical solutions in the embodiments of the present disclosure more clearly, drawings used in the description of the embodiments are briefly described below. Apparently, the drawings described below illustrate part of the embodiments of the present disclosure, and on the premise that no creative work is done, those of ordinary skill in the art may obtain other drawings based on the drawings described below.

DETAILED DESCRIPTION

Figure 1:
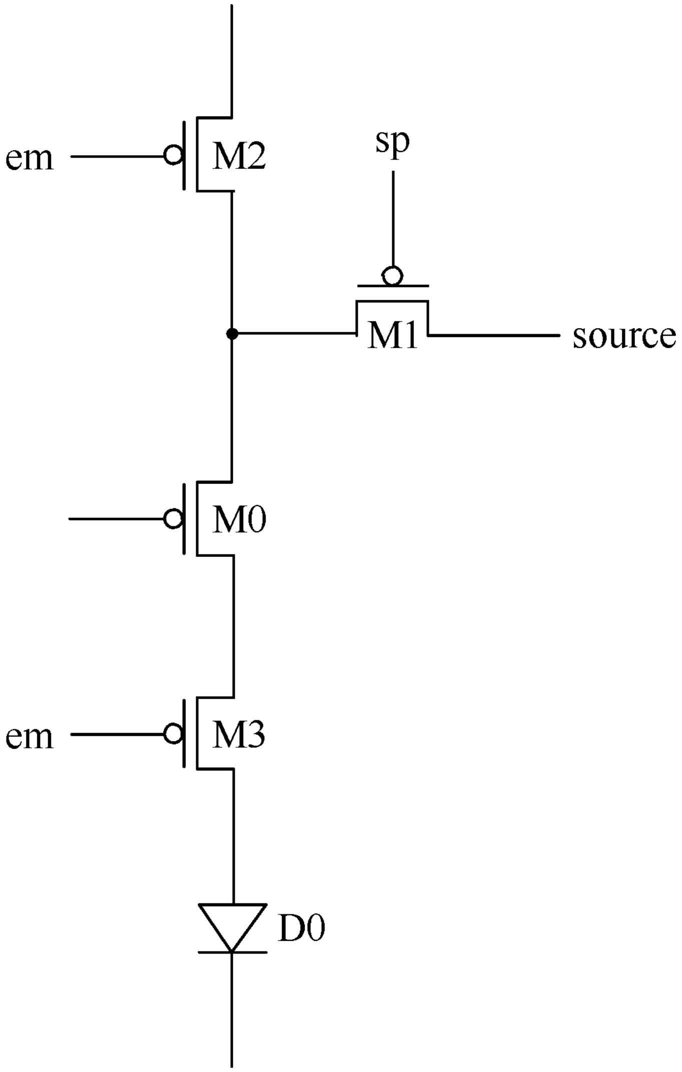
FIG. 1 is a structural diagram of a pixel circuit in the related art.

The technical solutions in the embodiments of the present disclosure are described clearly and completely in conjunction with the drawings in the embodiments of the present disclosure from which the solutions of the present disclosure are better understood by those skilled in the art. Apparently, the embodiments described below are part, not all, of the embodiments of the present disclosure. Based on the embodiments of the present disclosure, all other embodiments obtained by those of ordinary skill in the art on the premise that no creative work is done are within the scope of the present disclosure.

It is to be noted that the terms "first", "second", and the like in the description, claims, and drawings of the present disclosure are used for distinguishing between similar objects and are not necessarily used for describing a particular order or sequence. It should be understood that the data used in this manner is interchangeable in appropriate cases so that the embodiments of the present disclosure described here can be implemented in an order not illustrated or described here. In addition, the terms "comprising", "including", and variations thereof are intended to encompass a non-exclusive inclusion. For example, a process, method, system, product, or device that includes a series of steps or elements not only includes the expressly listed steps or elements but may also include other steps or elements that are not expressly listed or are inherent to such a process, method, product, or device. It is apparent to those skilled in the art that various modifications and variations in the present disclosure may be made without departing from the spirit or scope of the present disclosure. Therefore, the present disclosure is intended to cover modifications and variations of the present disclosure that fall within the scope of the corresponding claims (the claimed technical solutions) and their equivalents. It is to be noted that the embodiments of the present disclosure, if not in collision, may be combined with each other.

As described in the background, when the display panel performs displaying at a relatively low refresh rate, a display screen is prone to the flickering problem. Through research, the inventor finds the reason for the preceding problem, and the reason is specifically described below.

When the existing display panel is used for low-frequency display, a method of frame skip is usually used to reduce the frequency. For example, when the display panel works at a relatively low refresh rate, each display frame is configured to include a write frame and a retention frame after the write frame, durations of write frames at different refresh rates are the same, and the duration of the retention frame is adjusted so that the actual display effect can satisfy the corresponding refresh rate. In general, the duration of the retention frame is configured to be an integer multiple of the duration of the write frame during frequency reduction and frame skip. However, at some refresh rates, the duration of the retention frame is a non-integer multiple of the duration of the write frame, resulting in the flickering problem of the display screen.

Figure 2:
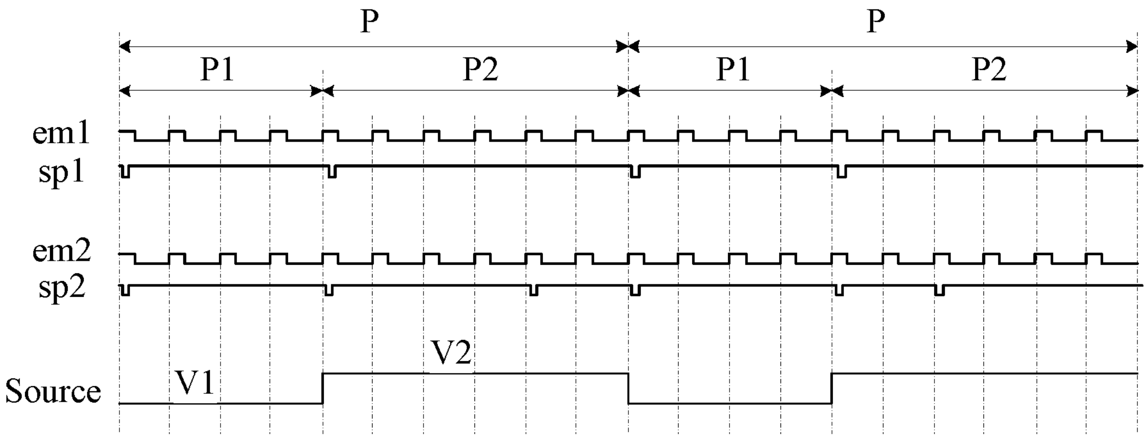
FIG. 2 is a drive timing diagram of the pixel circuit in FIG. 1.

FIG. 1 is a structural diagram of a pixel circuit in the related art. FIG. 2 is a drive timing diagram of the pixel circuit in FIG. 1. In conjunction with FIGS. 1 and 2, the case where the display panel works at a refresh rate of 24 Hz is used as an example for the description below. Each display cycle P includes a write frame P1 and a retention frame P2. In the case where the duration of the write frame P1 is the duration of each display frame at 60 Hz, the duration of the retention frame P2 at 24 Hz is a non-integer multiple of the duration of the write frame P1, that is, 1.5 times the duration of the write frame P1. The pixel circuit includes a drive transistor M0, a first transistor M1, a second transistor M2, a third transistor M3, and a light-emitting element D0. The first transistor M1 separately adjusts the voltage state of the drive transistor M0 in the write frame P1 and the retention frame P2. In the write frame P1, in response to a signal at a scan signal terminal sp, the first transistor M1 writes a data voltage V1 connected to a first voltage terminal Source to the drive transistor M0. In the retention frame P2, in response to the signal at the scan signal terminal sp, the first transistor M1 writes a bias voltage V2 connected to the first voltage terminal Source to the drive transistor M0 so as to regulate a bias state of the drive transistor M0.

FIG. 2 separately shows two sets of signals that can be connected to the scan signal terminal sp and a light emission control signal terminal em in the pixel circuit. In the first working case of the display panel, the scan signal terminal sp is connected to a scan signal sp1, and the light emission control signal terminal em is connected to a light emission control signal em1. A low-level pulse interval of the scan signal sp1 in the write frame P1 and the retention frame P2 of the previous display cycle P is the duration of four level groups (one high level and one low level that are adjacent are one level group) of the light emission control signal em1. A low-level pulse interval of the scan signal sp1 in the retention frame P2 of the previous display cycle P and the write frame P1 of the next display cycle P is the duration of six level groups of the light emission control signal em1. It can be seen that the first transistor M1 adjusts the voltage state of the drive transistor M0 at different time intervals, and the voltage state of the drive transistor M0 determines the brightness of the light-emitting element D0, leading to the flickering problem.

In the second working case of the display panel, the scan signal terminal sp is connected to a scan signal sp2, and the light emission control signal terminal em is connected to a light emission control signal em2. A time interval between two low-level pulses in the retention frame P2 of the scan signal sp2 is the duration of four level groups of the light emission control signal em2. A time interval between the second one of the two low-level pulses in the retention frame P2 of the current display cycle P and the first one of the low-level pulses of the next display cycle P of the scan signal sp2 is the duration of two level groups of the light emission control signal em2. It can be seen that the first transistor M1 adjusts the voltage state of the drive transistor M0 at different time intervals, and the voltage state of the drive transistor M0 determines the brightness of the light-emitting element D0, leading to the flickering problem.

Figure 3:
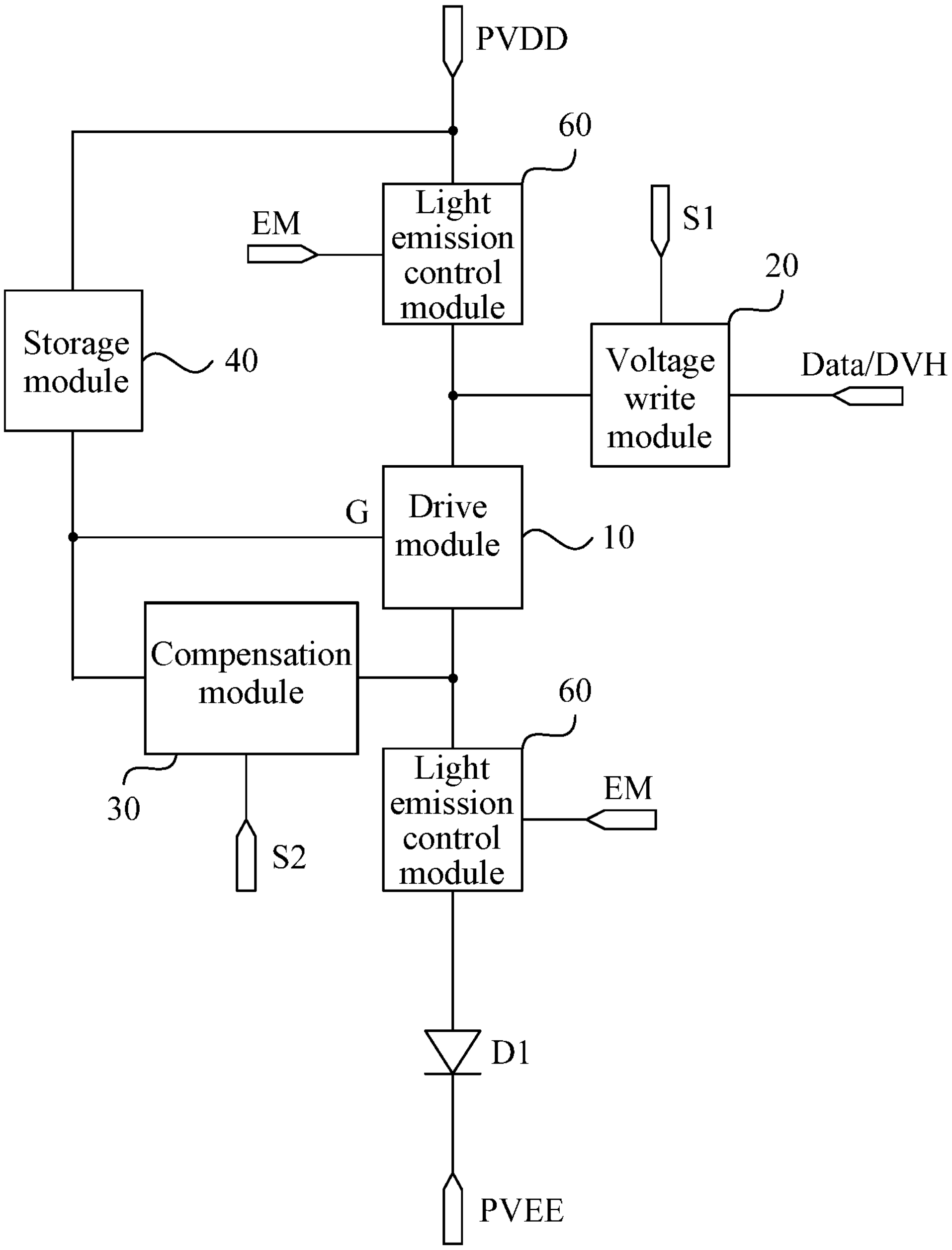
FIG. 3 is a structural diagram of a pixel circuit according to an embodiment of the present disclosure.
Figure 4:
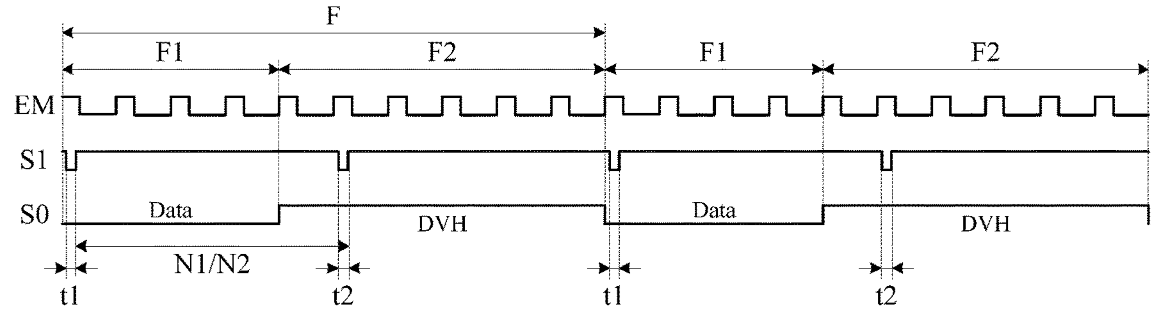
FIG. 4 is a drive timing diagram of a pixel circuit according to an embodiment of the present disclosure.
Figure 5:
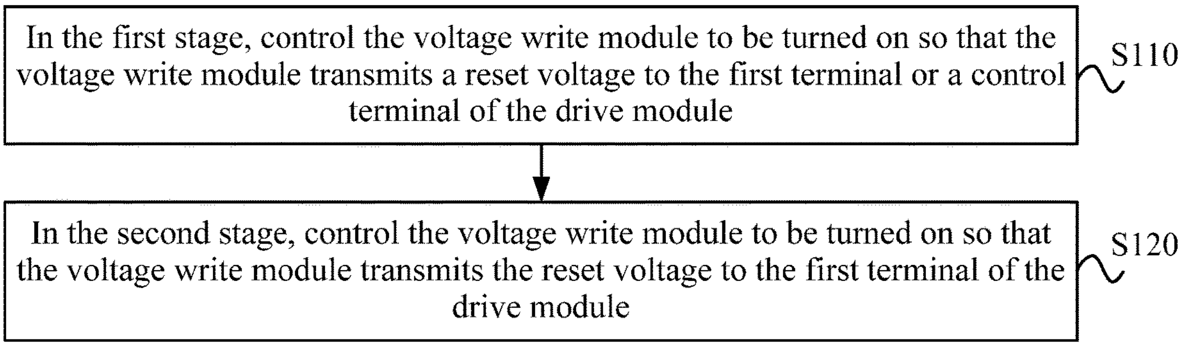
FIG. 5 is a flowchart of a driving method of a pixel circuit according to an embodiment of the present disclosure.

In response to the preceding problem, an embodiment of the present disclosure provides a driving method of a pixel circuit. The method is used for driving the pixel circuit to work and can be performed by the pixel circuit in any embodiment of the present disclosure. FIG. 3 is a structural diagram of a pixel circuit according to an embodiment of the present disclosure. FIG. 4 is a drive timing diagram of a pixel circuit according to an embodiment of the present disclosure. FIG. 5 is a flowchart of a driving method of a pixel circuit according to an embodiment of the present disclosure. In conjunction with FIGS. 3 and 4, the pixel circuit includes a drive module 10 and a voltage write module 20. The drive module 10 is configured to drive a light-emitting element D1 in a display cycle F, where the display cycle F includes a write frame F1 and a retention frame F2. The voltage write module 20 is connected to a first terminal of the drive module 10, a working stage of the voltage write module 20 includes at least one first stage t1 and at least one second stage t2, the first stage t1 is located in the write frame F1, and the second stage t2 is located in the retention frame F2. Referring to FIG. 5, the driving method of a pixel circuit specifically includes the steps described below.

In S110, in the first stage, the voltage write module is controlled to be turned on so that the voltage write module transmits a reset voltage to the first terminal or a control terminal of the drive module.

In S120, in the second stage, the voltage write module is controlled to be turned on so that the voltage write module transmits the reset voltage to the first terminal of the drive module.

An interval duration between at least one second stage t2 and an adjacent first stage t1 or between at least one second stage t2 and an adjacent second stage t2 is a first duration N1, and an interval duration between any second stage t2 and an adjacent first stage t1 or between any second stage t2 and an adjacent second stage t2 is a second duration N2, where in at least part of display cycles F, the first duration N1 is different from a total duration of the write frame F1, and an absolute value of a difference between the second duration N2 and the total duration of the write frame F1 is less than or equal to a preset duration.

In conjunction with FIGS. 3 and 4, specifically, the light-emitting element D1 may be an organic light-emitting diode (OLED) or a micro light-emitting diode (microLED). Each display cycle F may be understood as a display frame. When the display panel works at some refresh rates, each display cycle F includes the write frame F1 and the retention frame F2. The write frame F1 is also referred to as "a refresh frame" or "a data frame". In the write frame F1, a voltage of a control terminal G of the drive module 10 changes, and the drive module 10 generates a drive current according to the voltage of the control terminal G to drive the light-emitting element D1 to emit light. In the retention frame F2, the voltage of the control terminal G of the drive module 10 remains unchanged, and the drive module 10 can still generate the drive current according to the voltage of the control terminal G to drive the light-emitting element D1 to emit light.

Each of the write frame F1 and the retention frame F2 includes a light emission stage and a non-light-emission stage. The first stage t1 is located in the non-light-emission stage of the write frame F1, and the second stage t2 is located in the non-light-emission stage of the retention frame F2. The voltage write module 20 separately adjusts the voltage state of the drive module 10 in the first stage t1 of the write frame F1 and the second stage t2 of the retention frame F2 in each display cycle F. Specifically, in the first stage t1, the voltage write module 20 is controlled to be turned on so that the voltage write module 20 transmits the reset voltage to the first terminal or the control terminal G of the drive module 10 to reset the voltage at the first terminal or the control terminal G of the drive module 10 and adjust the voltage state of the drive module 10. In the second stage t2, the voltage write module 20 is controlled to be turned on so that the voltage write module 20 transmits the reset voltage to the first terminal of the drive module 10 to reset the voltage at the first terminal of the drive module 10 and adjust the voltage state of the drive module 10.

The retention frame F2 may include multiple second stages t2. For example, FIG. 4 only shows the case where the retention frame F2 includes one second stage t2. The first stage t1 adjacent to the second stage t2 may be the first stage t1 in the same display cycle F as the second stage t2 or may be the first stage t1 in the next display cycle F. Two adjacent second stages t2 may be in the same display cycle F. In at least part of display cycles F, the interval duration between at least one second stage t2 and the adjacent first stage t1 or between at least one second stage t2 and the adjacent second stage t2, that is, the first duration N1, is configured to be different from the total duration of the write frame F1; and the interval duration between each second stage t2 and the adjacent first stage t1 or between each second stage t2 and the adjacent second stage t2 is the second duration N2, and the absolute value of the difference between the second duration N2 and the total duration of the write frame F1 is configured to be less than or equal to the preset duration. The size of the preset duration may be set according to specific requirements.

For example, in two display cycles F shown in FIG. 4, the interval duration between each second stage t2 and its adjacent first stage t1 is the same, that is, the first duration N1 is the same as the second duration N2, each of the first duration N1 and the second duration N2 is different from the total duration of the write frame F1, an absolute value of a difference between the first duration N1 and the total duration of the write frame F1 is less than or equal to the preset duration, and the absolute value of the difference between the second duration N2 and the total duration of the write frame F1 is less than or equal to the preset duration. The advantage of such a setting is that the voltage write module 20 can adjust the voltage state of the drive module 10 at a similar or even the same time interval each time, that is, in FIG. 4, the time interval between every two adjacent stages including a first stage t1 and an adjacent second stage t2 is the same, and the voltage state of the drive module 10 determines the brightness of the light-emitting element D1; therefore, the technical solutions of this embodiment are conducive to alleviating the flickering phenomenon caused by a large difference between time intervals of the voltage state change of the drive module 10.

To sum up, in the technical solutions of the embodiment of the present disclosure, in the first stage in the write frame in each display cycle, the voltage write module is controlled to transmit the reset voltage to the first terminal or control terminal of the drive module so as to adjust the voltage state of the drive module; in the second stage in the retention frame in each display cycle, the voltage write module is controlled to transmit the reset voltage to the first terminal of the drive module so as to adjust the voltage state of the drive module. In at least part of display cycles, the interval duration between at least one second stage and its adjacent first stage or between at least one second stage and its adjacent second stage, that is, the first duration, is configured to be different from the total duration of the write frame, and the interval duration between each second stage and its adjacent first stage or between each second stage and its adjacent second stage is, the second duration, and the absolute value of the difference between the second duration and the total duration of the write frame is configured to be less than or equal to the preset duration. Therefore, in the case where the preset duration is relatively short, in at least part of display cycles, time intervals between adjacent first and second stages are similar or even the same and the time intervals between two adjacent second stages are similar or even the same, that is, the voltage write module adjusts the voltage state of the drive module at a similar or even the same time interval each time, which is conducive to alleviating the flickering phenomenon caused by a large difference between time intervals of the voltage state change of the drive module, thereby optimizing the display effect.

Figure 6:
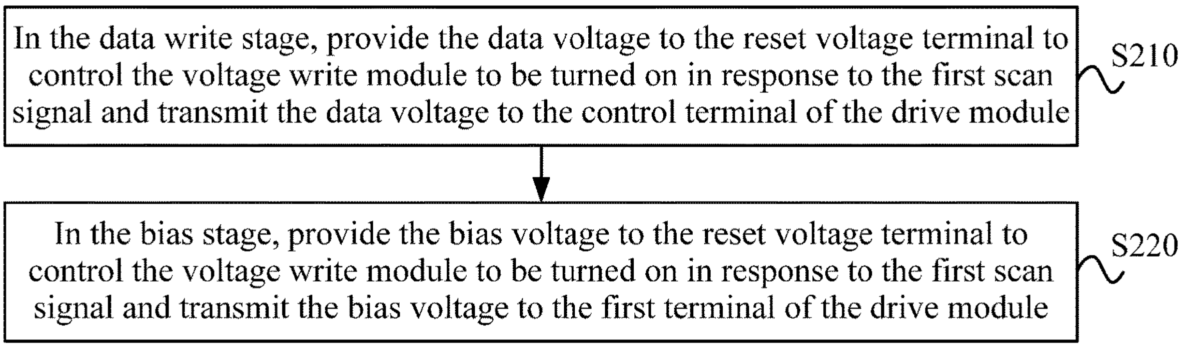
FIG. 6 is a flowchart of another driving method of a pixel circuit according to an embodiment of the present disclosure.

Various pixel circuit structures are applicable to the present disclosure, and some of the pixel circuit structures are described in detail below as examples. In an embodiment, referring to FIG. 3, a control terminal of the voltage write module 20 is connected to a first scan signal S1, a first terminal of the voltage write module 20 is connected to a reset voltage terminal, the reset voltage connected to the reset voltage terminal includes a data voltage Data and a bias voltage DVH, and a second terminal of the voltage write module 20 is connected to the first terminal of the drive module 10. Correspondingly, the first stage includes a data write stage and the second stage includes a bias stage. FIG. 6 is a flowchart of another driving method of a pixel circuit according to an embodiment of the present disclosure. Referring to FIG. 6, the method specifically includes the steps described below.

In S210, in the data write stage, the data voltage is provided to the reset voltage terminal so as to control the voltage write module to be turned on in response to the first scan signal and transmit the data voltage to the control terminal of the drive module.

In conjunction with FIGS. 3 and 4, optionally, the pixel circuit further includes a compensation module 30 and a storage module 40. A control terminal of the compensation module 30 is connected to a second scan signal S2 (the second scan signal S2 is not shown in FIG. 4), the compensation module 30 is connected between a second terminal and the control terminal G of the drive module 10, and the compensation module 30 is configured to compensate for a threshold voltage of the drive module 10. The storage module 40 is connected to the control terminal G of the drive module 10 and configured to store the voltage of the control terminal G of the drive module 10.

The first stage t1 may be the data write stage. In the first stage t1 before the light emission stage of the write frame F1, the reset voltage connected to a reset voltage terminal S0 is the data voltage Data, the voltage write module 20 is turned on in response to the first scan signal S1, and the compensation module 30 is turned on in response to the second scan signal S2 so that the voltage write module 20 and the compensation module 30 transmit the data voltage Data to the control terminal G of the drive module 10. At the same time, the compensation module 30 compensates for the threshold voltage of the drive module 10, and the storage module 40 stores the voltage of the control terminal G of the drive module 10 so that the drive module 10 can drive, according to the voltage stored in the storage module 40, the light-emitting element D1 to emit light in the light emission stage.

In S220, in the bias stage, the bias voltage is provided to the reset voltage terminal so as to control the voltage write module to be turned on in response to the first scan signal and transmit the bias voltage to the first terminal of the drive module.

The second stage t2 may be the bias stage. In the second stage t2 before the light emission stage of the retention frame F2, the reset voltage connected to the reset voltage terminal S0 is the bias voltage DVH, and the voltage write module 20 is turned on in response to the first scan signal S1 and transmits the bias voltage DVH to the first terminal of the drive module 10 to reset the voltage of the first terminal of the drive module 10 and adjust a bias state of the drive module 10 so that the drive module 10 is in an on-bias (OBS) state, which is conducive to improving the display uniformity.

In the technical solutions of this embodiment, the first stage t1 is configured to be the data write stage and the second stage t2 is configured to be the bias stage. In the first stage t1, the voltage write module 20 transmits the data voltage Data to the control terminal G of the drive module 10. In the second stage t2, the voltage write module 20 transmits the bias voltage DVH to the first terminal of the drive module 10. The interval duration between at least one second stage t2 and its adjacent first stage t1 or between at least one second stage t2 and its adjacent second stage t2, that is, the first duration N1, is different from the total duration of the write frame F1; and the interval duration between each second stage t2 and its adjacent first stage t1 or between each second stage t2 and its adjacent second stage t2 is the second duration N2, and the absolute value of the difference between the second duration N2 and the total duration of the write frame F1 is less than or equal to the preset duration. Therefore, in the case where the preset duration is relatively short, in at least part of display cycles F, the time intervals between each second stage t2 and a first stage t1 which is adjacent to the each second stage t2 are similar and time intervals between two adjacent second stages t2 are similar, that is, the voltage write module 20 adjusts the voltage state of the drive module 10 at a similar time interval each time. In particular, in the technical solutions of this embodiment, the time interval between every two adjacent stages including a first stage t1 and its adjacent second stage t2 is the same, and the voltage write module 20 adjusts the voltage state of the drive module 10 at the same time interval each time, which is conducive to alleviating the flickering phenomenon caused by a large difference between time intervals of the voltage state change of the drive module 10.

Figure 7:
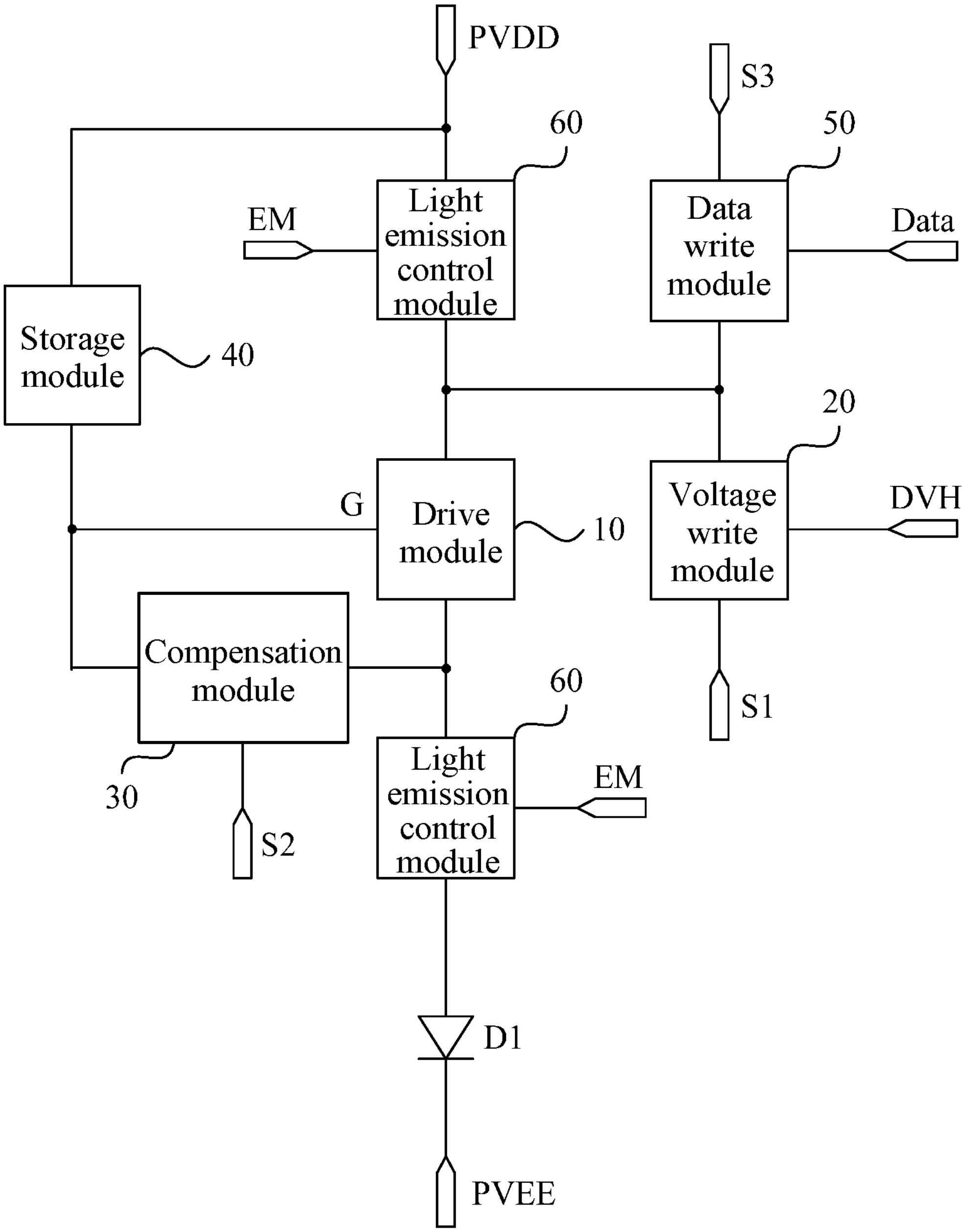
FIG. 7 is another structural diagram of a pixel circuit according to an embodiment of the present disclosure.

FIG. 7 is another structural diagram of a pixel circuit according to an embodiment of the present disclosure. FIG.

8 is another drive timing diagram of a pixel circuit according to an embodiment of the present disclosure. In conjunction with FIGS. 7 and 8, optionally, the reset voltage includes the bias voltage DVH, the control terminal of the voltage write module 20 is connected to the first scan signal S1, the first terminal of the voltage write module 20 is connected to the bias voltage DVH, and the second terminal of the voltage write module 20 is connected to the first terminal of the drive module 10. Correspondingly, the first stage t1 includes a first bias stage and the second stage t2 includes a second bias stage. FIG. 9 is another flowchart of a driving method of a pixel circuit according to an embodiment of the present disclosure. Referring to FIG. 9, the method specifically includes the steps described below.

In S310, in the first bias stage, the voltage write module is controlled to be turned on in response to the first scan signal and transmit the bias voltage to the first terminal of the drive module.

Figure 8:
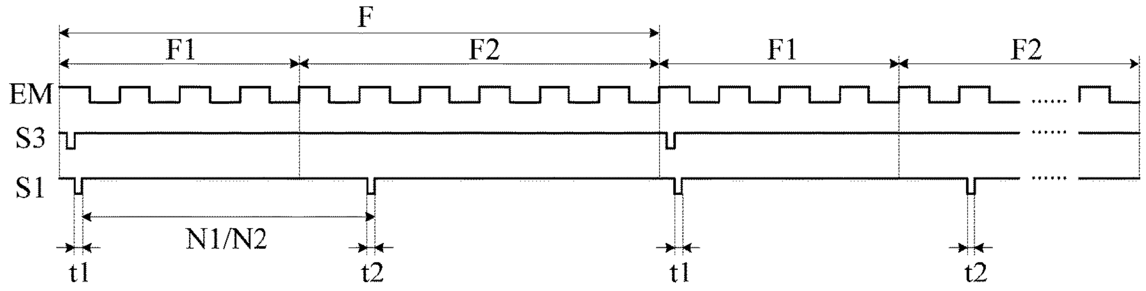
FIG. 8 is another drive timing diagram of a pixel circuit according to an embodiment of the present disclosure.
Figure 9:
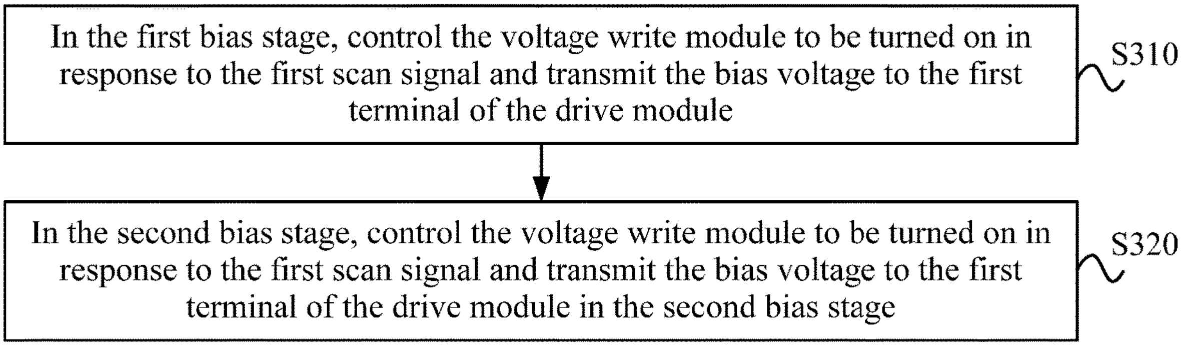
FIG. 9 is another flowchart of a driving method of a pixel circuit according to an embodiment of the present disclosure.

In conjunction with FIGS. 7 and 8, optionally, the pixel circuit further includes a data write module 50, where a control terminal of the data write module 50 is connected to a third scan signal S3, and the data write module 50 is connected to the drive module 10 and configured to write the data voltage Data to the control terminal G of the drive module 10.

The first stage t1 may be the first bias stage, and the write frame F1 further includes the data write stage. The data write stage is located before the first stage t1, and both the data write stage and the first stage t1 are located before the light emission stage of the write frame F1. In the data write stage, the data write module 50 is controlled to be turned on in response to the third scan signal S3, and the compensation module 30 is controlled to be turned on in response to the second scan signal S2 so that the data write module 50 and the compensation module 30 transmit the data voltage Data to the control terminal G of the drive module 10. In the first stage t1, the voltage write module 20 is controlled to be turned on in response to the first scan signal S1 to transmit the bias voltage DVH to the first terminal of the drive module 20 to reset the voltage of the first terminal of the drive module 10 and adjust the bias state of the drive module 10 so that the drive module 10 is in the OBS state, which is conducive to improving the display uniformity.

In S320, in the second bias stage, the voltage write module is controlled to be turned on in response to the first scan signal and transmit the bias voltage to the first terminal of the drive module in the second bias stage.

The second stage t2 may be the second bias stage. In the second stage t2 before the light emission stage of the retention frame F2, the voltage write module 20 is controlled to be turned on in response to the first scan signal S1 to transmit the bias voltage DVH to the first terminal of the drive module 10 to reset the voltage of the first terminal of the drive module 10 and adjust the bias state of the drive module 10 so that the drive module 10 is in the OBS state, which is conducive to improving the display uniformity.

In the technical solutions of this embodiment, the first stage t1 is configured to be the first bias stage, and the second stage t2 is configured to be the second bias stage. In the first stage t1 and the second stage t2, the voltage write module 20 transmits the bias voltage DVH to the first terminal of the drive module 10. The interval duration between at least one second stage t2 and the adjacent first stage t1 or between at least one second stage t2 and the adjacent second stage t2, that is, the first duration N1, is different from the total duration of the write frame F1; and the interval duration between each second stage t2 and the adjacent first stage t1 or between each second stage t2 and the adjacent second stage t2 is the second duration N2, and the absolute value of the difference between the second duration N2 and the total duration of the write frame F1 is less than or equal to the preset duration. Therefore, in the case where the preset duration is relatively short, in at least part of display cycles F, time intervals between adjacent first stages t1 and second stages t2 are similar and time intervals between two adjacent second stages t2 are similar, that is, the voltage write module 20 adjusts the bias state of the drive module 10 at a similar time interval each time. In particular, in the technical solutions of this embodiment, the time interval between every two adjacent stages including a first stage t1 and its adjacent second stage t2 is the same, and the voltage write module 20 adjusts the bias state of the drive module 10 at the same time interval each time, which is conducive to alleviating the flickering phenomenon caused by a large difference between time intervals of the bias state change of the drive module 10.

In conjunction with FIGS. 3 and 4 or FIGS. 7 and 8, based on the preceding embodiments, in the display cycle F, the first scan signal S1 includes at least two first on-levels, and the first on-levels are used for controlling the voltage write module 20 to be turned on. In at least part of display cycles F, an interval duration between at least one first on-level and an adjacent first on-level in the first scan signal S1 is different from the total duration of the write frame F1, and an absolute value of a difference between an interval duration between any first on-level and an adjacent first on-level in the first scan signal S1 and the total duration of the write frame F1 is less than or equal to the preset duration.

Specifically, the voltage write module 20 may be composed of a thin-film transistor. In the case where the voltage write module 20 is composed of a P-type transistor, the first on-level is low, and in the case where the voltage write module 20 is composed of an N-type transistor, the first on-level is high. The case where the first on-levels in the first scan signal S1 are low is used as an example in FIGS. 4 and 8. When the control terminal of the voltage write module 20 is connected to the first on-level, the voltage write module 20 is turned on so that the voltage write module 20 transmits the data voltage Data to the control terminal of the drive module 10 to adjust the voltage state of the drive module 10, or the voltage write module 20 transmits the bias voltage DVH to the first terminal of the drive module 10 to adjust the voltage state of the drive module 10.

The interval duration between the first on-level and the adjacent first on-level in the first scan signal S1 determines the time interval at which the voltage write module 20 adjusts the voltage state of the drive module 10 each time. In the first scan signal S1, there exists at least one interval duration between a first on-level and an adjacent first on-level, which is configured to be different from the total duration of the write frame F1; and the absolute value of the difference between the interval duration between each first on-level and the adjacent first on-level and the total duration of the write frame F1 is configured to be less than or equal to the preset duration. In this manner, in the case where the preset duration is relatively short, at least part of interval durations between adjacent first on-levels in the first scan signal S1 are similar, that is, the voltage write voltage 20 adjusts the voltage state of the drive module 10 at a similar time interval each time. Both FIGS. 4 and 8 show the case where the interval duration between every two adjacent first on-levels in the first scan signal S1 is the same so that the voltage write module 20 adjusts the voltage state of the drive module 10 at the same time interval each time, which is conducive to alleviating the flickering phenomenon caused by a large difference between time intervals of the voltage state change of the drive module 10.

In conjunction with FIGS. 3 and 4 or FIGS. 7 and 8, further, the write frame F1 in each display cycle F is located before the retention frame F2, at least one first on-level is located in the write frame F1, and at least one first on-level is located in the retention frame F2. In at least part of display cycles F, an interval duration between the at least one first on-level located in the retention frame F2 and a previous first on-level is different from the total duration of the write frame F1.

Specifically, in practical applications, according to the total duration of the write frame F1 and the total duration of the retention frame F2 in each display cycle F, the number of first on-levels in the first scan signal S1 may be configured and timing of the first on-levels in the retention frame F2 may be adjusted. For example, as shown in FIG. 4 or 8, in the case where the total duration of the retention frame F2 is 1.5 times the total duration of the write frame F1, the first scan signal S1 may be configured to include one first on-level located in the write frame F1 and one first on-level located in the retention frame F2. And the timing of the first on-levels in the retention frame F2 is adjusted so that the interval duration between the first on-level in the retention frame F2 and the first on-level in the write frame F1 in the same display cycle F is 1.5 times the total duration of the write frame F1, that is, different from the total duration of write frame F1. In this manner, the interval duration between every two adjacent first on-levels in the first scan signal S1 is the same, and the voltage write module 20 adjusts the voltage state of the drive module 10 at the same time interval each time, which is conducive to alleviating the flickering phenomenon caused by a large difference between time intervals of the voltage state change of the drive module 10.

Referring to FIG. 4 or 8, optionally, at least part of display cycles F include a display cycle F with a refresh rate of a target low frequency, refresh rates respectively corresponding to at least part of display cycles F includes a preset low frequency, the target low frequency is a refresh rate lower than the preset low frequency, and in the display cycle F corresponding to the target low frequency, the total duration of the retention frame F2 is a non-integer multiple of the total duration of the write frame F1.

In an embodiment, the preset low frequency includes 60 Hz, the target low frequency is a refresh rate lower than 60 Hz, and in the display cycle F corresponding to the target low frequency, the total duration of the retention frame F2 is a non-integer multiple of the total duration of the write frame F1. For example, in the case where the preset low frequency is 60 Hz, the total duration of the write frame F1 at the target low frequency is the total duration of each display frame at 60 Hz, and the total duration of the retention frame F2 at the target low frequency is a non-integer multiple of the total duration of the write frame F1. The refresh rate corresponding to the drive timing shown in FIGS. 4 and 8 is the target low frequency, and the target low frequency is 24 Hz. In the case where the refresh rate of the display panel is 24 Hz, the total duration of the write frame F1 at 24 Hz may be configured to be the total duration of each display frame at 60 Hz, and the total duration of the retention frame F2 is 1.5 times the total duration of the write frame F1 so that the total duration of each display cycle F can satisfy the total duration of each display frame at 24 Hz.

In other embodiments, the preset low frequency is not limited to 60 Hz, and the target low frequency is not limited to 24 Hz, as long as the target low frequency is a refresh rate lower than the preset low frequency, the total duration of the write frame F1 of the target low frequency is the total duration of each display frame at the preset low frequency, and the total duration of the retention frame F2 is a non-integer multiple of the total duration of the write frame F1.

In conjunction with FIGS. 3 and 4 or FIGS. 7 and 8, optionally, the pixel circuit further includes a light emission control module 60, the light emission control module 60, the drive module 10, and the light-emitting element D1 are connected in series between a first power terminal and a second power terminal, a control terminal of the light emission control module 60 is connected to a light emission control signal EM, and the light emission control module 60 is turned on or turned off in response to the light emission control signal EM. The light emission control signal EM includes multiple second on-levels, and the multiple second on-levels are used for controlling the light emission control module 60 to be turned on. In the display cycle F corresponding to the target low frequency, the number of the second on-levels located in the write frame F1 is n, and the number of the second on-levels located in the retention frame F2 is m, where n is a positive integer greater than or equal to 2, and m is a non-integer multiple of n.

Specifically, the first power terminal is connected to a first power voltage PVDD, the second power terminal is connected to a second power voltage PVEE, and in the light emission stage of the write frame F1 and the retention frame F2, the light emission control module 60 is turned on in response to the light emission control signal EM so that a conductive path is formed between the first power terminal and the second power terminal, and the drive module 10 generates the drive current according to the voltage of the control terminal G to drive the light-emitting element D1 to emit light. In the non-light-emission stage of the write frame F1 and the retention frame F2, the light emission control module 60 is turned off in response to the light emission control signal EM so that the conductive path cannot be formed between the first power terminal and the second power terminal, and the drive module 10 stops driving the light-emitting element D1 to emit light.

The light emission control module 60 may be composed of a thin-film transistor. In the case where the light emission control module 60 is composed of a P-type transistor, the second on-level is low, and in the case where the light emission control module 60 is composed of an N-type transistor, the second on-level is high. The case where the second on-levels in the light emission control signal EM are low is used as an example in FIGS. 4 and 8. The number of the second on-levels in the light emission control signal EM in each display cycle F determines the light emission duration of the light-emitting element D1. In the case where the preset low frequency is 60 Hz, in the display cycle F corresponding to the target low frequency, the number n of the second on-levels in the light emission control signal EM in the write frame F1 is the same as the number of the second on-levels in the light emission control signal EM in each display frame at 60 Hz, and the number m of the second on-levels in the light emission control signal EM located in the retention frame F2 is a non-integer multiple of n. For example, the number of the second on-levels in the light emission control signal EM in each display frame at 60 Hz is 4, and in the display cycle F corresponding to the target low frequency of 24 Hz, n=4 and m=1.5*4.

In conjunction with FIGS. 3 and 4 or FIGS. 7 and 8, further, in at least part of display cycles F, the light emission control signal EM includes n level groups located in the write frame F1 and m level groups located in the retention frame F2, each level group includes a second on-level and an off-level, and the off-level is used for controlling the light emission control module 60 to be turned off. Timing of the first on-level in the first scan signal S1 overlaps timing of the off-level in the light emission control signal EM, an interval duration between at least one first on-level located in the retention frame F2 and a previous first on-level is different from a total duration of second on-levels and off-levels in the n level groups, and an absolute value of a difference between an interval duration between any first on-level and an adjacent first on-level and the total duration of the second on-levels and the off-levels in the n level groups is less than or equal to the preset duration.

One of the second on-level or the off-level is high and the other one of the second on-level or the off-level is low. The total duration of the write frame F1 in the display cycle F is equal to the total duration of the second on-levels and the off-levels in the n level groups.

When the display panel performs displaying at a refresh rate lower than the preset low frequency, the method of frame skip is used to reduce the frequency, that is, the retention frame is inserted after the write frame in each display cycle, and at some refresh rates lower than the preset low frequency, the duration corresponding to the inserted retention frame is an integer multiple of the duration corresponding to the write frame. For example, in the case where the preset low frequency is 60 Hz and the current refresh rate of the display panel is 15 Hz, the total duration of the write frame in each display cycle is the total duration of each display cycle at 60 Hz, the retention frame is inserted after the write frame, and the total duration of the retention frame is three times the total duration of the write frame.

When the display panel performs displaying at the target low frequency lower than the preset low frequency, the duration corresponding to the inserted retention frame F2 in each display cycle F is a non-integer multiple of the duration corresponding to the write frame F1. For example, the light emission control signal EM in each display cycle F at the preset low frequency includes n level groups, and the duration of each display cycle is the duration corresponding to the n level groups. If the current refresh rate of the display panel is the target low frequency, the light emission control signal EM in the write frame F1 in each display cycle F includes n level groups. Based on the write frame F1, the number of level groups in the light emission control signal EM is increased through a longV manner, that is, the retention frame F2 is inserted after the write frame F1. The light emission control signal EM in the retention frame F2 is configured to include m level groups, and m is a non-integer multiple of n, that is to say, the duration corresponding to the retention frame F2 is a non-integer multiple of the duration corresponding to the write frame F1.

For example, referring to FIG. 4 or 8, the current refresh rate of the display panel is the target low frequency, the target low frequency is 24 Hz, and the preset low frequency is 60 Hz. If the light emission control signal EM in each display cycle F at 60 Hz includes four level groups, the light emission control signal EM in the write frame F1 in each display cycle F at 24 Hz includes four level groups, the light emission control signal EM in the retention frame F2 includes six level groups, and the duration corresponding to the retention frame F2 is a non-integer multiple of the duration corresponding to the write frame F1. On this basis, the timing of the first on-level in the first scan signal S1 overlaps the timing of the off-level in the light emission control signal EM so that both the first stage t1 and the second stage t2 occur in the non-light-emission stage; the interval duration between at least one first on-level located in the retention frame F2 and the previous first on-level in the first scan signal S1 is different from the total duration of the second on-levels and the off-levels in the n level groups, that is, the first duration N1 is different from the total duration of the write frame F1; and the absolute value of the difference between the interval duration between any first on-level and the adjacent first on-level in the first scan signal S1 and the total duration of the second on-levels and the off-levels in the n level groups is less than or equal to the preset duration, that is, the absolute value of the difference between the second duration N2 and the total duration of the write frame F1 is less than or equal to the preset duration.

Based on the preceding embodiments, optionally, the preset duration satisfies that a degree of flickers caused by an interval duration between adjacent first on-levels in the first scan signal S1 is non-recognizable by human eyes.

In conjunction with FIGS. 1 and 2, the interval duration between adjacent low-level pulses in a scan signal sp includes the duration of two level groups, the duration of four level groups, and the duration of six level groups in the light emission control signal EM so that the interval durations between adjacent low-level pulses vary widely, causing that the first transistor M1 adjusts the voltage state of the drive transistor M0 at different time intervals, leading to the flickering problem. In the technical solutions of this embodiment, the absolute value of the difference between the interval duration between any first on-level and the adjacent first on-level in the first scan signal S1 and the total duration of the write frame F1 is less than or equal to the preset duration, and the preset duration satisfies that the degree of flickers caused by the interval duration between adjacent first on-levels in the first scan signal S1 is non-recognizable by human eyes so that the voltage write module 20 adjusts the voltage state of the drive module 10 at a similar or even the same time interval each time, thereby alleviating the flickering phenomenon caused by a large difference between time intervals of the voltage state change of the drive module 10.

Optionally, n includes 2 and a positive integer multiple of 2, and the preset duration includes 0.25 times the total duration of the write frame F1. For example, in the case where n=2, the light emission control signal EM in each display cycle F at the preset low frequency includes two level groups, the total duration of the write frame F1 in each display cycle F at the target low frequency corresponds to the total duration of two level groups, and the preset duration is 0.25 times the total duration of two level groups, that is, a half of the total duration of one level group. In the case where n=4, the light emission control signal EM in each display cycle F at the preset low frequency includes four level groups, the total duration of the write frame F1 in each display cycle F at the target low frequency corresponds to the total duration of four level groups, and the preset duration is 0.25 times the total duration of four level groups, that is, the total duration of one level group. In the case where n is another value, the calculation method of the preset duration may be performed in a similar manner.

In conjunction with FIGS. 3 and 4 or FIGS. 7 and 8, in an embodiment, the preset low frequency includes 60 Hz, the target low frequency includes 24 Hz, and the light emission control signal EM includes four level groups located in the write frame F1 and six level groups located in the retention frame F2. In the display cycle F corresponding to the target low frequency, the first scan signal S1 includes one first on-level located in the write frame F1 and one first on-level located in the retention frame F2, timing of the first on-level located in the write frame F1 overlaps timing of the off-level located in the first one of the four level groups in the write frame F1, and timing of the first on-level located in the retention frame F2 overlaps timing of the off-level located in the second one of the six level groups in the retention frame F2.

In this embodiment, based on the preset low frequency of 60 Hz, frame skip and frequency reduction are performed in the longV manner so as to satisfy the display requirement at the target low frequency of 24 Hz. The total duration of the write frame F1 corresponds to the total duration of four level groups in the light emission control signal EM. In the retention frame F2, the timing of the first on-level in the first scan signal S1 overlaps the timing of the off-level in the second one of the six level groups in the light emission control signal EM so that the interval duration between every two adjacent first on-levels in the first scan signal S1 is the total duration of five level groups in the light emission control signal EM, and the difference between the interval duration between every two adjacent first on-levels in the first scan signal S1 and the total duration of the write frame F1 is the total duration of one level group, that is, the preset duration is the total duration of one level group. In this manner, the voltage write module 20 alternately adjusts the voltage state of the drive module 10 in the first stage t1 and the second stage t2, and the voltage write module 20 adjusts the voltage state of the drive module 10 at the same time interval each time, thereby alleviating the flickering phenomenon caused by a large difference between time intervals of the voltage state change of the drive module 10.

Figure 10:
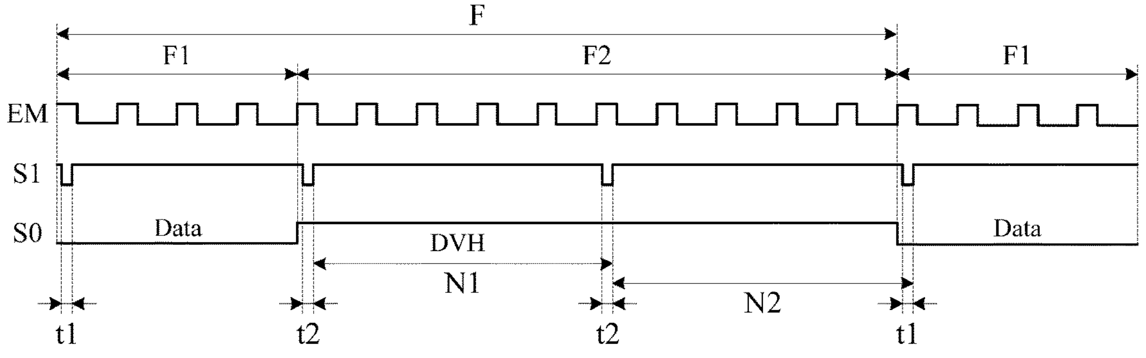
FIG. 10 is another drive timing diagram of a pixel circuit according to an embodiment of the present disclosure.
Figure 11:
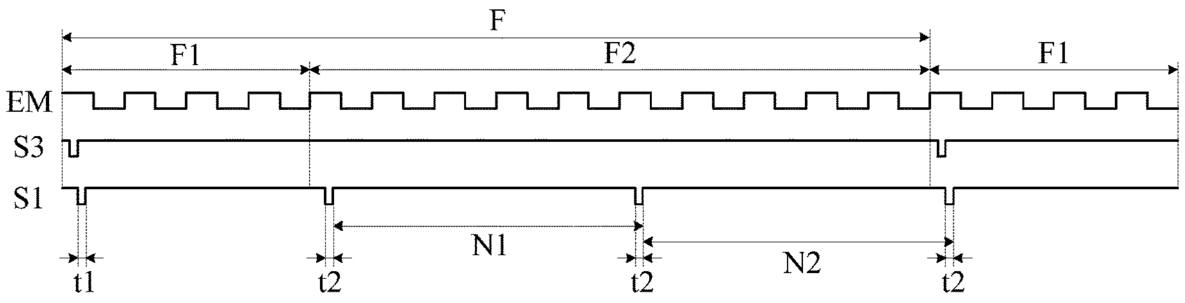
FIG. 11 is another drive timing diagram of a pixel circuit according to an embodiment of the present disclosure.

FIG. 10 is another drive timing diagram of a pixel circuit according to an embodiment of the present disclosure and is applicable to the driving of the pixel circuit shown in FIG. 3. FIG. 11 is another drive timing diagram of a pixel circuit according to an embodiment of the present disclosure and is applicable to the driving of the pixel circuit shown in FIG. 7. In conjunction with FIGS. 3 and 10 or FIGS. 7 and 11, in another embodiment, the preset low frequency includes 60 Hz, the target low frequency includes 17 Hz, and the light emission control signal EM includes four level groups located in the write frame F1 and ten level groups located in the retention frame F2. In the display cycle F corresponding to the target low frequency, the first scan signal S1 includes one first on-level located in the write frame F1 and two first on-levels located in the retention frame F2, timing of the first on-level located in the write frame F1 overlaps timing of the off-level located in the first one of the four level groups in the write frame F1, timing of the first one of the two first on-levels located in the retention frame F2 overlaps timing of the off-level located in the first one of the ten level groups in the retention frame F2, and timing of the second one of the two first on-levels located in the retention frame F2 overlaps timing of the off-level located in the sixth one of the ten level groups in the retention frame F2.

For example, based on the preset low frequency of 60 Hz, frame skip and frequency reduction are performed in the longV manner so as to satisfy the display requirement at the target low frequency of 17 Hz. The total duration of each display cycle F at 60 Hz corresponds to the total duration of four level groups in the light emission control signal EM, the total duration of the write frame F1 in each display cycle F at 17 Hz corresponds to the total duration of four level groups in the light emission control signal EM, the total duration of the retention frame F2 corresponds to the total duration of ten level groups in the light emission control signal EM, and the total duration of the retention frame F2 is a non-integer multiple of the total duration of the write frame F1. In the retention frame F2, the timing of the first one of the two first on-levels in the first scan signal S1 overlaps the timing of the off-level in the first one of the ten level groups in the light emission control signal EM, and the timing of the second one of the two first on-levels in the first scan signal S1 overlaps the timing of the off-level in the sixth one of the ten level groups in the light emission control signal EM so that part of interval durations between adjacent first on-levels in the first scan signal S1 are the total duration of five level groups in the light emission control signal EM, and the other part of interval durations between adjacent first on-levels are the total duration of four level groups in the light emission control signal EM. In the case where the preset duration is the total duration of one level group, the difference between the interval duration between every two adjacent first on-levels in the first scan signal S1 and the total duration of the write frame F1 is less than or equal to the total duration of one level group so that the voltage write module 20 adjusts the voltage state of the drive module 10 at a similar time interval each time, thereby alleviating the flickering phenomenon caused by a large difference between time intervals of the voltage state change of the drive module 10.

It is to be noted that the case where the refresh rate of the display panel is 24 Hz or 17 Hz is used as an example in FIGS. 4, 8, 10, and 11. In practical applications, various refresh rates are applicable to the technical solutions of the present disclosure and include, but are not limited to, any target low frequency that is lower than the preset low frequency and has the total duration of the retention frame being a non-integer multiple of the total duration of the write frame.

An embodiment of the present disclosure further provides a pixel circuit that can be driven by the driving method of a pixel circuit provided in any embodiment of the present disclosure. In conjunction with FIGS. 3 and 4, the pixel circuit includes the drive module 10 and the voltage write module 20.

The drive module 10 is configured to drive the light-emitting element D1 in the display cycle F, where the display cycle F includes the write frame F1 and the retention frame F2.

The voltage write module 20 is connected to the first terminal of the drive module 10, where the working stage of the voltage write module 20 includes at least one first stage t1 and at least one second stage t2, the first stage t1 is located in the write frame F1, the second stage t2 is located in the retention frame F2, and the voltage write module 20 is configured to transmit a reset voltage to the first terminal or the control terminal G of the drive module 10 in the first stage t1 and transmit the reset voltage to the first terminal of the drive module 10 in the second stage t2.

An interval duration between at least one second stage t2 and an adjacent first stage t1 or between at least one second stage t2 and an adjacent second stage t2 is a first duration N1, and an interval duration between any second stage t2 and an adjacent first stage t1 or between any second stage t2 and an adjacent second stage t2 is a second duration N2, where in at least part of display cycles F, the first duration N1 is different from a total duration of the write frame F1, and an absolute value of a difference between the second duration N2 and the total duration of the write frame F1 is less than or equal to a preset duration.

In the technical solutions of the embodiment of the present disclosure, in the first stage in the write frame in each display cycle, the voltage write module is controlled to transmit the reset voltage to the first terminal or control terminal of the drive module so as to adjust the voltage state of the drive module; in the second stage in the retention frame in each display cycle, the voltage write module is controlled to transmit the reset voltage to the first terminal of the drive module so as to adjust the voltage state of the drive module. In at least part of display cycles, the interval duration between at least one second stage and the adjacent first stage or between at least one second stage and the adjacent second stage, that is, the first duration, is configured to be different from the total duration of the write frame; and the interval duration between each second stage and the adjacent first stage or between each second stage and the adjacent second stage is the second duration, and the absolute value of the difference between the second duration and the total duration of the write frame is configured to be less than or equal to the preset duration. And in the case where the preset duration is relatively short, in at least part of display cycles, time intervals between adjacent first and second stages are similar or even the same and time intervals between two adjacent second stages are similar or even the same, that is, the voltage write module adjusts the voltage state of the drive module at a similar or even the same time interval each time, which is conducive to alleviating the flickering phenomenon caused by a large difference between time intervals of the voltage state change of the drive module, thereby optimizing the display effect.

In conjunction with FIGS. 3 and 4, in an embodiment, optionally, the first stage t1 includes the data write stage, the second stage t2 includes the bias stage, and the reset voltage includes the data voltage Data and the bias voltage DVH. The control terminal of the voltage write module 20 is connected to the first scan signal S1, the first terminal of the voltage write module 20 is connected to the reset voltage terminal, the reset voltage terminal is connected to the data voltage Data in the data write stage, the reset voltage terminal S0 is connected to the bias voltage DVH in the bias stage, and the second terminal of the voltage write module 20 is connected to the first terminal of the drive module 10. The voltage write module 20 is configured to be turned on in the data write stage in response to the first scan signal S1 to transmit the data voltage Data to the control terminal G of the drive module 10 and to be turned on in the bias stage in response to the first scan signal S1 to transmit the bias voltage DVH to the first terminal of the drive module 10.

Figure 12:
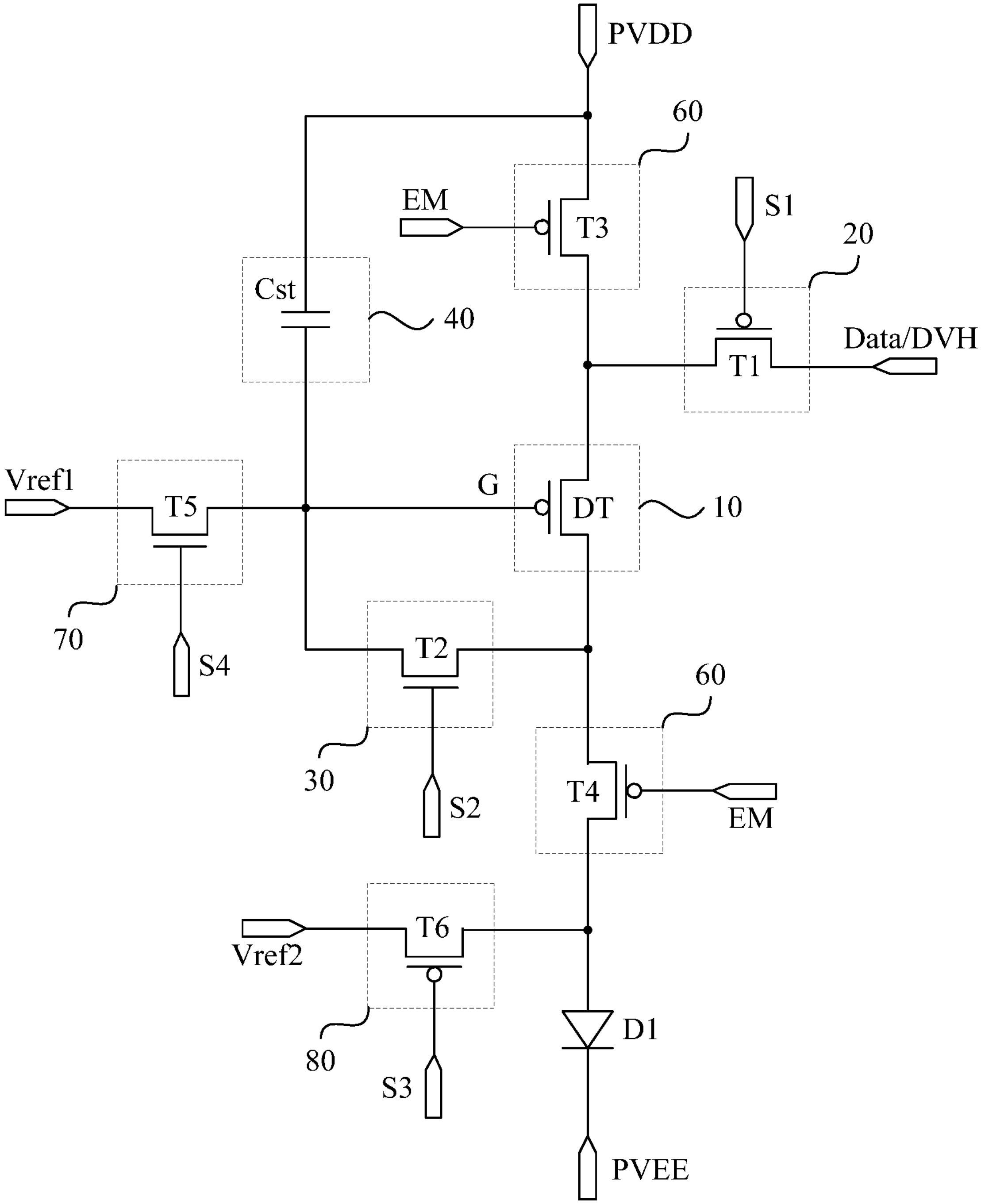
FIG. 12 is another structural diagram of a pixel circuit according to an embodiment of the present disclosure.

FIG. 12 is another structural diagram of a pixel circuit according to an embodiment of the present disclosure. Referring to FIG. 12, based on the preceding embodiments, optionally, the pixel circuit further includes the compensation module 30, the storage module 40, the light emission control module 60, a first initialization module 70, and a second initialization module 80.

The control terminal of the compensation module 30 is connected to the second scan signal S2, and the compensation module 30 is connected between the second terminal and the control terminal G of the drive module 10 and configured to compensate for the threshold voltage of the drive module 10. A first terminal of the storage module 40 is connected to the control terminal G of the drive module 10, a second terminal of the storage module 40 is connected to a fixed voltage, and the storage module 40 is configured to store the voltage of the control terminal G of the drive module 10. The light emission control module 60, the drive module 10, and the light-emitting element D1 are connected in series between the first power terminal and the second power terminal, the control terminal of the light emission control module 60 is connected to the light emission control signal EM, and the light emission control module 60 is turned on or turned off in response to the light emission control signal EM. A control terminal of the first initialization module 70 is connected to a fourth scan signal S4, a first terminal of the first initialization module 70 is connected to a first initialization voltage Vref1, a second terminal of the first initialization module 70 is connected to the control terminal G of the drive module 10, and the first initialization module 70 is configured to write the first initialization voltage Vref1 to the control terminal G of the drive module 10. A control terminal of the second initialization module 80 is connected to the third scan signal S3, a first terminal of the second initialization module 80 is connected to a second initialization voltage Vref2, a second terminal of the second initialization module 80 is connected to a first pole of the light-emitting element D1, and the second initialization module 80 is configured to write the second initialization voltage Vref2 to the first pole of the light-emitting element D1.

Further, the drive module 10 includes a drive transistor DT, the voltage write module 20 includes a first transistor T1, the compensation module 30 includes a second transistor T2, the light emission control module 60 includes a third transistor T3 and a fourth transistor T4, the first initialization module 70 includes a fifth transistor T5, the second initialization module 80 includes a sixth transistor T6, and the storage module 40 includes a storage capacitor Cst. A gate of the first transistor T1 is connected to the first scan signal S1, a first pole of the first transistor T1 is connected to the reset voltage terminal, and a second pole of the first transistor T1 is connected to a first pole of the drive transistor DT. A gate of the second transistor T2 is connected to the second scan signal S2, a first pole of the second transistor T2 is connected to a second pole of the drive transistor DT, and a second pole of the second transistor T2 is connected to a gate of the drive transistor DT. A gate of the third transistor T3 and a gate of the fourth transistor T4 are both connected to the light emission control signal EM, the third transistor T3 is connected between the first power terminal and the first pole of the drive transistor DT, and the fourth transistor T4 is connected between the second pole of the drive transistor DT and the first pole of the light-emitting element D1. A gate of the fifth transistor T5 is connected to the fourth scan signal S4, a first pole of the fifth transistor T5 is connected to the first initialization voltage Vref1, and a second pole of the fifth transistor T5 is connected to the gate of the drive transistor DT. A gate of the sixth transistor T6 is connected to the third scan signal S3, a first pole of the sixth transistor T6 is connected to the second initialization voltage Vref2, and a second pole of the sixth transistor T6 is connected to the first pole of the light-emitting element D1. A first pole of the storage capacitor Cst is connected to the gate of the drive transistor DT, and a second pole of the storage capacitor Cst is connected to a fixed voltage. For example, the second pole of the storage capacitor Cst is connected to the first power terminal and thus connected to the first power voltage PVDD.

In conjunction with FIGS. 7 and 8, in another embodiment, optionally, the first stage t1 includes the first bias stage, the second stage t2 includes the second bias stage, and the reset voltage includes the bias voltage DVH. The control terminal of the voltage write module 20 is connected to the first scan signal S1, the first terminal of the voltage write module 20 is connected to the bias voltage DVH, and the second terminal of the voltage write module 20 is connected to the first terminal of the drive module 10. The voltage write module 20 is configured to be turned on in the first bias stage and the second bias stage in response to the first scan signal S1 to separately transmit the bias voltage DVH to the first terminal of the drive module 10 in the first bias stage and the second bias stage.

In an embodiment, the pixel circuit further includes the data write module 50, where the control terminal of the data write module 50 is connected to the third scan signal S3, a first terminal of the data write module 50 is connected to the data voltage Data, a second terminal of the data write module 50 is connected to the drive module 10, and the data write module 50 is configured to write the data voltage Data to the control terminal G of the drive module 10. FIG. 7 shows the case where the second terminal of the data write module 50 is connected to the first terminal of the drive module 10 so that the data write module 50 and the compensation module write the data voltage Data to the control terminal G of the drive module 10. In other embodiments, the second terminal of the data write module 50 may be connected to the control terminal G of the drive module 10 so that the data write module 50 directly writes the data voltage Data to the control terminal G of the drive module 10.

Figure 13:
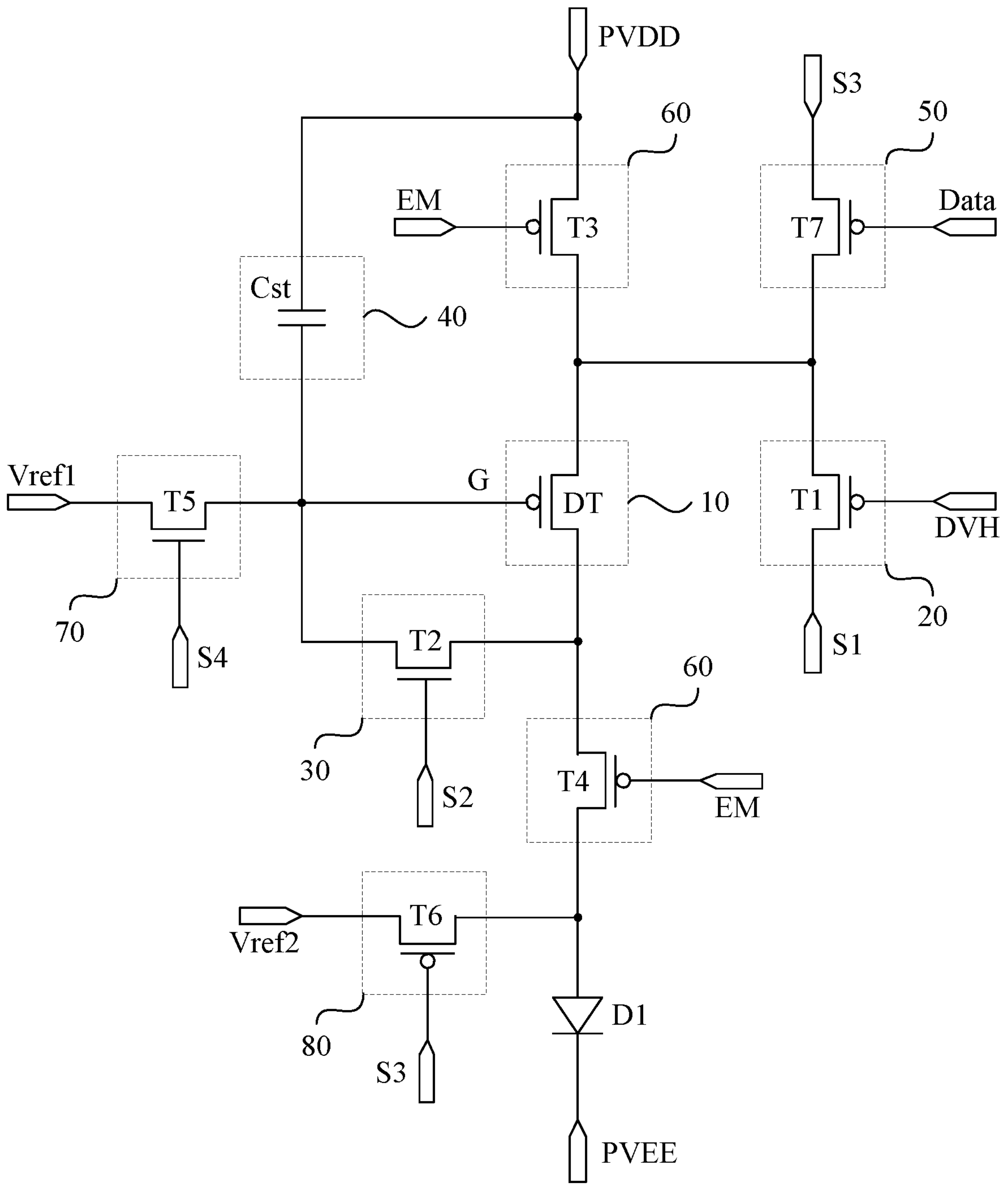
FIG. 13 is another structural diagram of a pixel circuit according to an embodiment of the present disclosure.

FIG. 13 is another structural diagram of a pixel circuit according to an embodiment of the present disclosure. Referring to FIG. 13, based on the preceding embodiments, optionally, the drive module 10 includes the drive transistor DT, the voltage write module 20 includes the first transistor T1, and the data write module 50 includes a seventh transistor T7. The gate of the first transistor T1 is connected to the first scan signal S1, the first pole of the first transistor T1 is connected to the bias voltage DVH, and the second pole of the first transistor T1 is connected to the first pole of the drive transistor DT. A gate of the seventh transistor T7 is connected to the third scan signal S3, a first pole of the seventh transistor T7 is connected to the data voltage Data, and a second pole of the seventh transistor T7 is connected to the first pole or the gate of the drive transistor DT. The structures of other modules and transistors in the modules in the pixel circuit shown in FIG. 13 are similar to those of the pixel circuit shown in FIG. 12, and reference may be made to the preceding embodiments for understanding.

Figure 14:
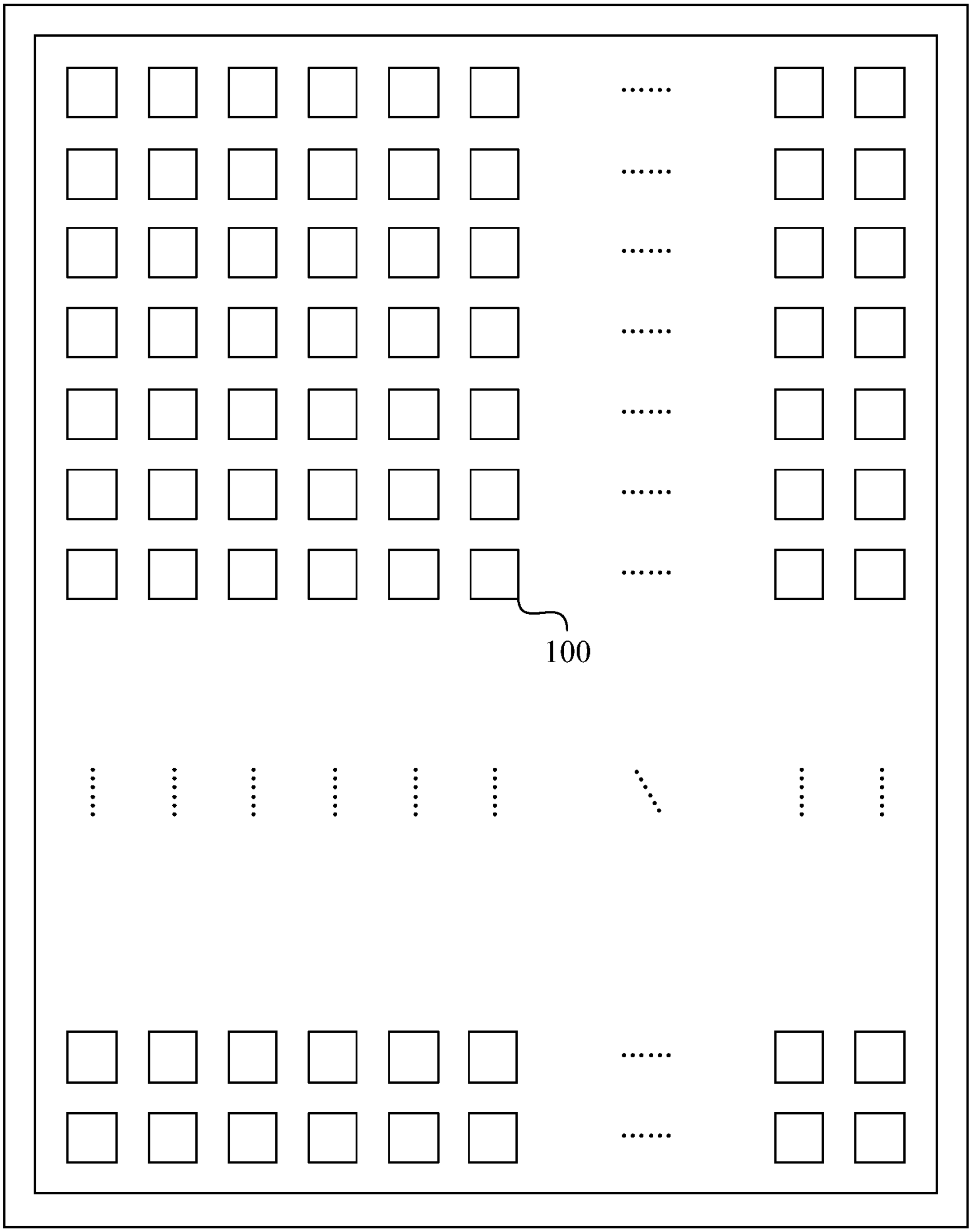
FIG. 14 is a structural diagram of a display panel according to an embodiment of the present disclosure.

An embodiment of the present disclosure further provides a display panel including the pixel circuit in any embodiment of the present disclosure. FIG. 14 is a structural diagram of a display panel according to an embodiment of the present disclosure. Referring to FIG. 14, the display panel may include multiple rows of pixel circuits 100. The display panel may be an OLED display panel, a microLED display panel, or the like. The display panel provided in the embodiment of the present disclosure includes the pixel circuit in any embodiment of the present disclosure and has the corresponding function modules and beneficial effects of the pixel circuit. The details are not repeated here.

Figure 15:
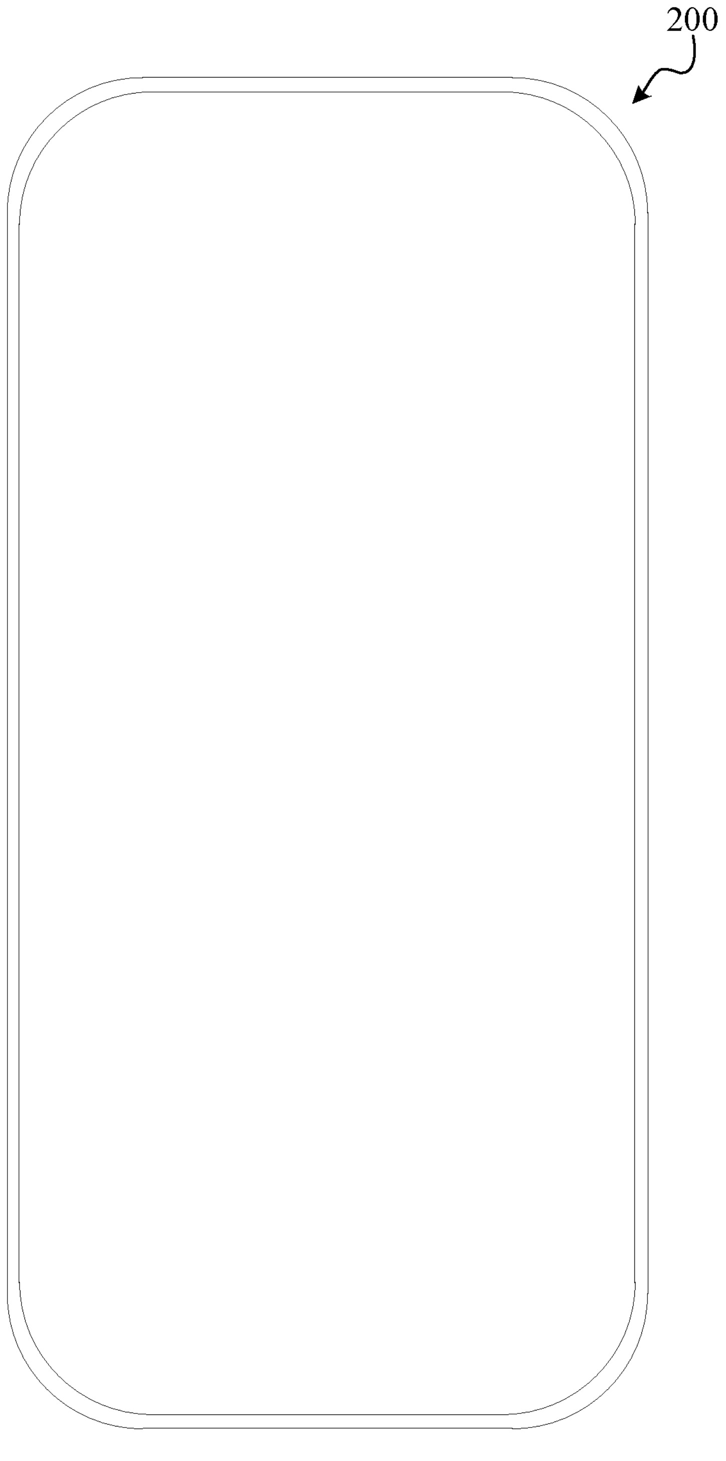
FIG. 15 is a structural view of a display device according to an embodiment of the present disclosure.

An embodiment of the present disclosure further provides a display device. FIG. 15 is a structural view of a display device according to an embodiment of the present disclosure. Referring to FIG. 15, a display device 200 provided in the embodiment of the present disclosure includes the display panel in any preceding embodiment. Therefore, the display device 200 has the corresponding functional structure and beneficial effects in the display panel. The details are not repeated here. The display device 200 may be a mobile phone or any electronic product with a display function, including, but not limited to, a television, a laptop, a desktop display, a tablet computer, a digital camera, a smart bracelet, smart glasses, an in-vehicle display, medical equipment, industrial control equipment, and a touch interactive terminal. No special limitations are made thereto in the embodiments of the present disclosure.

It is to be understood that various forms of processes shown above may be adopted with steps reordered, added, or deleted. For example, the steps described in the present disclosure may be performed in parallel, sequentially, or in different orders, as long as the desired results of the technical solutions of the present disclosure can be achieved, and no limitation is imposed herein.

The preceding embodiments do not limit the scope of the present disclosure. It is to be understood by those skilled in the art that various modifications, combinations, sub-combinations, and substitutions may be performed according to design requirements and other factors. Any modification, equivalent substitution, improvement, or the like made within the spirit and principle of the present disclosure is within the scope of the present disclosure.

What is claimed is:

1. A driving method of a pixel circuit, wherein the pixel circuit comprises a drive module, a voltage write module, and a compensation module, wherein the drive module is configured to drive a light-emitting element in a display cycle, the display cycle comprises a write frame and a retention frame, the voltage write module is connected to a first terminal of the drive module, a working stage of the voltage write module comprises at least one first stage and at least one second stage, the first stage is located in the write frame, and the second stage is located in the retention frame, and the compensation module is connected between a second terminal and a control terminal of the drive module;

wherein the driving method of a pixel circuit comprises:

in the first stage, controlling the voltage write module to be turned on so that the voltage write module transmits a reset voltage to the first terminal or the control terminal of the drive module, the reset voltage is transmitted to the control terminal of the drive module by turning on the drive module od the compensation module; and in the second stage, controlling the voltage write module to be turned on so that the voltage write module transmits the reset voltage to the first terminal of the drive module;

wherein a plurality of display cycles comprises a plurality of first stages and a plurality of second stages, among the plurality of first stages and the plurality of second stages, an interval duration between at least one second stage and an adjacent first stage or an interval duration between at least one second stage and an adjacent second stage is a first duration, and an interval duration between any second stage and an adjacent first stage or an interval duration between any second stage and an adjacent second stage is a second duration, wherein in at least part of the plurality of display cycles, the first duration is different from a total duration of the write frame, and an absolute value of a difference between the second duration and the total duration of the write frame is less than or equal to a preset duration, wherein the drive module comprises a drive transistor, the voltage write module comprises a first transistor, the compensation module comprises a second transistor, the light emission control module comprises a third transistor and a fourth transistor.

2. The driving method of a pixel circuit of claim 1, wherein the first stage comprises a data write stage, the second stage comprises a bias stage, the reset voltage comprises a data voltage and a bias voltage, a control terminal of the voltage write module is connected to a first scan signal, a first terminal of the voltage write module is connected to a reset voltage terminal, and a second terminal of the voltage write module is connected to the first terminal of the drive module;

wherein in the first stage, controlling the voltage write module to be turned on so that the voltage write module transmits the reset voltage to the first terminal or the control terminal of the drive module comprises:

in the data write stage, providing the data voltage to the reset voltage terminal to control the voltage write module to be turned on in response to the first scan signal and transmit the data voltage to the control terminal of the drive module;

wherein in the second stage, controlling the voltage write module to be turned on so that the voltage write module transmits the reset voltage to the first terminal of the drive module comprises:

in the bias stage, providing the bias voltage to the reset voltage terminal to control the voltage write module to be turned on in response to the first scan signal and transmit the bias voltage to the first terminal of the drive module.

3. The driving method of a pixel circuit of claim 1, wherein the first stage comprises a first bias stage, the second stage comprises a second bias stage, the reset voltage comprises a bias voltage, a control terminal of the voltage write module is connected to a first scan signal, a first terminal of the voltage write module is connected to the bias voltage, and a second terminal of the voltage write module is connected to the first terminal of the drive module;

wherein in the first stage, controlling the voltage write module to be turned on so that the voltage write module transmits the reset voltage to the first terminal or the control terminal of the drive module comprises:

in the first bias stage, controlling the voltage write module to be turned on in response to the first scan signal and transmit the bias voltage to the first terminal of the drive module;

wherein in the second stage, controlling the voltage write module to be turned on so that the voltage write module transmits the reset voltage to the first terminal of the drive module comprises:

in the second bias stage, controlling the voltage write module to be turned on in response to the first scan signal and transmit the bias voltage to the first terminal of the drive module in the second bias stage.

4. The driving method of a pixel circuit of claim 1, wherein a control terminal of the voltage write module is connected to a first scan signal, in the display circle, the first scan signal comprises at least two first on-levels, and the at least two first on-levels are used for controlling the voltage write module to be turned on; and in at least part of the plurality of display cycles, an interval duration between at least one first on-level and an adjacent first on-level in the first scan signal is different from the total duration of the write frame, and an absolute value of a difference between an interval duration between any first on-level and an adjacent first on-level in the first scan signal and the total duration of the write frame is less than or equal to the preset duration.

5. The driving method of a pixel circuit of claim 4, wherein the write frame is located before the retention frame in each display cycle, at least one first on-level of the at least two first on-levels is located in the write frame, and at least one first on-level of the at least two first on-levels is located in the retention frame; and in at least part of the plurality of display cycles, an interval duration between the at least one first on-level located in the retention frame and a previous first on-level is different from the total duration of the write frame.

6. The driving method of a pixel circuit of claim 1, wherein the at least part of the plurality of display cycles comprises a display cycle with a refresh rate of a target low frequency; and refresh rates respectively corresponding to the at least part of the plurality of display cycles comprises a preset low frequency, the target low frequency is a refresh rate lower than the preset low frequency, and in the display cycle corresponding to the target low frequency, a total duration of the retention frame is a non-integer multiple of the total duration of the write frame.

7. The driving method of a pixel circuit of claim 6, wherein the pixel circuit further comprises a light emission control module, the light emission control module, the drive module, and the light-emitting element are connected in series between a first power terminal and a second power terminal, a control terminal of the light emission control module is connected to a light emission control signal, and the light emission control module is configured be turned on or turned off in response to the light emission control signal; and the light emission control signal comprises a plurality of second on-levels, and the plurality of second on-levels are used for controlling the light emission control module to be turned on, wherein in the display cycle corresponding to the target low frequency, a number of the second on-levels located in the write frame is n, and a number of the second on-levels located in the retention frame is m, wherein n is a positive integer greater than or equal to 2, and m is a non-integer multiple of n.

8. The driving method of a pixel circuit of claim 1, wherein in the at least part of the plurality of display cycles:

light emission control signal comprises n level groups located in the write frame and m level groups located in the retention frame, each level group comprises a second on-level and an off-level, and the off-level is used for controlling the light emission control module to be turned off; and timing of a first on-level in a first scan signal overlaps timing of the off-level in the light emission control signal, an interval duration between at least one first on-level located in the retention frame and a previous first on-level is different from a total duration of second on-levels and off-levels in the n level groups, and an absolute value of a difference between an interval duration between any first on-level and an adjacent first on-level and the total duration of the second on-levels and the off-levels in the n level groups is less than or equal to the preset duration.

9. The driving method of a pixel circuit of claim 8, wherein the preset duration satisfies that a degree of flickers caused by an interval duration between adjacent first on-levels in the first scan signal is non-recognizable by human eyes.

10. The driving method of a pixel circuit of claim 8, wherein n comprises 2 and a positive integer multiple of 2, and the preset duration comprises 0.25 times the total duration of the write frame.

11. The driving method of a pixel circuit of claim 8, wherein a preset low frequency comprises 60 Hz, a target low frequency comprises 24 Hz, and the light emission control signal comprises four level groups located in the write frame and six level groups located in the retention frame; and in the display cycle corresponding to the target low frequency:

the first scan signal comprises one first on-level located in the write frame and one first on-level located in the retention frame, timing of the first on-level located in the write frame overlaps timing of the off-level located in a first one of the four level groups in the write frame, and timing of the first on-level located in the retention frame overlaps timing of the off-level located in a second one of the six level groups in the retention frame.

12. The driving method of a pixel circuit of claim 8, wherein the preset low frequency comprises 60 Hz, the target low frequency comprises 17 Hz, and the light emission control signal comprises four level groups located in the write frame and ten level groups located in the retention frame; and in the display cycle corresponding to the target low frequency:

the first scan signal comprises one first on-level located in the write frame and two first on-levels located in the retention frame, timing of the one first on-level located in the write frame overlaps timing of an off-level located in a first one of the four level groups in the write frame, timing of a first one of the two first on-levels located in the retention frame overlaps timing of an off-level located in a first one of the ten level groups in the retention frame, and timing of a second one of the two first on-levels located in the retention frame overlaps timing of an off-level located in a sixth one of the ten level groups in the retention frame.

13. A pixel circuit, comprising:

a drive module configured to drive a light-emitting element in a display cycle, wherein the display cycle comprises a write frame and a retention frame; and a voltage write module connected to a first terminal of the drive module and a compensation module connected between a second terminal and a control terminal of the drive module, wherein a working stage of the voltage write module comprises at least one first stage and at least one second stage, the first stage is located in the write frame, the second stage is located in the retention frame, and the voltage write module is configured to transmit a reset voltage to the first terminal or the control terminal of the drive module in the first stage and transmit the reset voltage to the first terminal of the drive module in the second stage, the reset voltage is transmitted to the control terminal of the drive module by turning on the drive module and the compensation module;

wherein a plurality of display cycles comprises a plurality of first stages and a plurality of second stages, among the plurality of first stages and the plurality of second stages, an interval duration between at least one second stage and an adjacent first stage or an interval duration between at least one second stage and an adjacent second stage is a first duration, and an interval duration between any second stage and an adjacent first stage or an interval duration between any second stage and an adjacent second stage is a second duration, wherein in at least part of the plurality of display cycles, the first duration is different from a total duration of the write frame, and an absolute value of a difference between the second duration and the total duration of the write frame is less than or equal to a preset duration, wherein the drive module comprises a drive transistor, the voltage write module comprises a first transistor, the compensation module comprises a second transistor, the light emission control module comprises a third transistor and a fourth transistor.

14. The pixel circuit of claim 13, wherein the first stage comprises a data write stage, the second stage comprises a bias stage, and the reset voltage comprises a data voltage and a bias voltage;

a control terminal of the voltage write module is connected to a first scan signal, a first terminal of the voltage write module is connected to a reset voltage terminal, the reset voltage terminal is connected to the data voltage in the data write stage, the reset voltage terminal is connected to the bias voltage in the bias stage, and a second terminal of the voltage write module is connected to the first terminal of the drive module; and the voltage write module is configured to be turned on in the data write stage in response to the first scan signal to transmit the data voltage to the control terminal of the drive module, and to be turned on in the bias stage in response to the first scan signal to transmit the bias voltage to the first terminal of the drive module.

15. The pixel circuit of claim 13, wherein the first stage comprises a first bias stage, the second stage comprises a second bias stage, and the reset voltage comprises a bias voltage;

a control terminal of the voltage write module is connected to a first scan signal, a first terminal of the voltage write module is connected to the bias voltage, and a second terminal of the voltage write module is connected to the first terminal of the drive module; and the voltage write module is configured to be turned on in the first bias stage and the second bias stage in response to the first scan signal to separately transmit the bias voltage to the first terminal of the drive module in the first bias stage and the second bias stage.

16. A display panel, comprising a pixel circuit wherein the pixel circuit, comprising:

a drive module configured to drive a light-emitting element in a display cycle, wherein the display cycle comprises a write frame and a retention frame; and a voltage write module connected to a first terminal of the drive module and a compensation module connected between a second terminal and a control terminal of the drive module, wherein a working stage of the voltage write module comprises at least one first stage and at least one second stage, the first stage is located in the write frame, the second stage is located in the retention frame, and the voltage write module is configured to transmit a reset voltage to the first terminal or the control terminal of the drive module in the first stage and transmit the reset voltage to the first terminal of the drive module in the second stage, the reset voltage is transmitted to the control terminal of the drive module by turning on the drive module and the compensation module;

wherein a plurality of display cycles comprises a plurality of first stages and a plurality of second stages, among the plurality of second stages and the plurality of second stages, an interval duration between at least one second stage and an adjacent first stage or an interval duration between at least one second stage and an adjacent second stage is a first duration, and an interval duration between any second stage and an adjacent first stage or an interval duration between any second stage and an adjacent second stage is a second duration, wherein in at least part of the plurality of display cycles, the first duration is different from a total duration of the write frame, and an absolute value of a difference between the second duration and the total duration of the write frame is less than or equal to a preset duration, wherein the drive module comprises a drive transistor, the voltage write module comprises a first transistor, the compensation module comprises a second transistor, the light emission control module comprises a third transistor and a fourth transistor.

17. The display panel of claim 16, wherein the first stage comprises a data write stage, the second stage comprises a bias stage, and the reset voltage comprises a data voltage and a bias voltage;

a control terminal of the voltage write module is connected to a first scan signal, a first terminal of the voltage write module is connected to a reset voltage terminal, the reset voltage terminal is connected to the data voltage in the data write stage, the reset voltage terminal is connected to the bias voltage in the bias stage, and a second terminal of the voltage write module is connected to the first terminal of the drive module; and the voltage write module is configured to be turned on in the data write stage in response to the first scan signal to transmit the data voltage to the control terminal of the drive module, and to be turned on in the bias stage in response to the first scan signal to transmit the bias voltage to the first terminal of the drive module.

18. The display panel of claim 16, wherein the first stage comprises a first bias stage, the second stage comprises a second bias stage, and the reset voltage comprises a bias voltage;

a control terminal of the voltage write module is connected to a first scan signal, a first terminal of the voltage write module is connected to the bias voltage, and a second terminal of the voltage write module is connected to the first terminal of the drive module; and the voltage write module is configured to be turned on in the first bias stage and the second bias stage in response to the first scan signal to separately transmit the bias voltage to the first terminal of the drive module in the first bias stage and the second bias stage.

19. A display device, comprising the display panel of claim 16.

* * * * *